Patented Oct. 24, 1950

2,526,700

UNITED STATES PATENT OFFICE 2,526,700

HYDROCARBON CONVERSION IN THE PRESENCE OF A STEAM-STABLE CATALYST

Hubert A. Shabaker, Media, Pa., assignor to Houdry Process Corporation, Wilmington, Del., a corporation of Delaware No Drawing. Application October 15, 1946,
Serial No. 703,274

3 Claims. (Cl. 196—52)

The present invention relates to catalytic hydrocarbon conversion processes and is particularly directed to improvements in treating and conditioning clay catalysts for use in such processes.

In the conversion of hydrocarbons, clay catalysts have been used and certain of these have been widely adopted in commercial operations. The most important clays so used are prepared by acid activation of certain montmorillonite type clays generally classed as sub-bentonites.

In the usual catalytic hydrocarbon conversion operations, the catalyst is contacted with the hydrocarbon charge stock at a predetermined rate or ratio and under selected conditions of temperature and pressure to form desired conversion products. As a result of this operation a carbonaceous or hydrocarbonaceous deposit called "coke" is deposited in the catalyst, which interferes with its normal catalytic activity. Accordingly, after a predetermined period of "onstream" operation, the catalyst is regenerated by treatment with an oxidizing gas at elevated temperature which burns off the coke. For instance, in cracking of normally liquid hydrocarbons to liquid and gaseous hydrocarbons of lower boiling point and lower molecular weight or in reforming of gasoline and naphthas effecting principally the improvement in the quality of the product, the hydrocarbon charge stock is contacted with the catalyst at temperatures of about 700–1000° F. Regeneration is carried out at temperatures generally below 1100° F. and usually in the range of 850–950° F.

In cracking particularly of heavier hydrocarbons such as those having constituents boiling above 900° F. or a mid-boiling point above 650° F., it is often the practice to introduce steam to assist in volatilization of the charge stock. Besides the steam thus introduced, in most if not all hydrocarbon conversion operations, steam is also formed among the reaction by-products during regeneration of the catalyst as well as during its use in a hydrocarbon conversion process. The presence of steam at the temperatures encountered during the conversion and regeneration, it has been noted, is one of the important factors causing aging of the catalyst, that is, on continued use and regeneration the catalyst loses activity. This aging effect of steam is particularly pronounced in the case of clay catalysts.

I have found that the stability of active clay catalysts to steam at high temperatures can be materially improved and other properties of the catalysts beneficially modified by subjecting the clay to a special treatment prior to use in a hydrocarbon conversion operation. In accordance with the present invention, acid-activated clay catalysts are subjected to heat treatment at a temperature above 1200° F. but not substantially above 1550° F.; the treatment being carried out in the substantial absence of water vapor. By this treatment, I have found, that the activity loss due to steam at temperatures normally encountered in catalytic operations is significantly reduced. I have also found that as a result of the stated heat treatment, particularly at higher temperatures within the specified range, as at about 1400° F. and above, additional valuable improvements are effected in that the thus treated clay catalysts show enhanced gasoline to coke and gasoline to gas ratios when employed in cracking of hydrocarbon charge stocks.

By increasing the steam stability of clay catalysts in accordance with the present invention, a number of important advantages may be obtained. By maintaining a comparatively higher activity during operations over a given period, increased yields of desired conversion products are obtained. Moreover, the useful life of the catalyst may thereby be significantly prolonged. In addition, higher maximum regeneration temperatures may be permissibly employed even during the initial stages of regeneration when the concentration of steam in the vicinity of the catalyst is highest, without the deleterious effects otherwise produced on catalyst of lesser steam stability.

In the preparation of clay catalysts for use in hydrocarbon conversion processes it has been the practice to pre-calcine the catalyst at or near the operating temperature range employed in the conversion process, or in some instances the catalyst has been used without pre-calcination, the required calcination being effected initially during use in the process. In either case, the catalyst is not subjected to temperatures as high as about 1100° F. in a controlled atmosphere free from water vapor.

The improved steam stability obtained by special heat treatment in accordance with the present invention is shown by the following example:

a. A commercial acid activated sub-bentonite clay, known commercially as Filtrol, was contacted in pelleted form with a stream of dried air at 1050° F. for 10 hours.

b. Another batch of the same pelleted clay was similarly treated with a stream of dried air at 1400° F. for 10 hours.

The air in each instance was dried by being passed over calcium chloride so that the moisture content was maintained below .005 mol per cent.

Each of the above treated samples was then similarly subjected to an accelerated aging test in flowing steam at 950° F. at a pressure of one atmosphere (absolute) with the following results:

| Calcination Temp. | Activity | | |
|---|---|---|---|
| | Initial | After 100 hrs. steam | After 1000 hrs. steam |
| (a) 1050° F., 10 hrs. in dried air | 39 | 29.5 | 27 |
| (b) 1400° F., 10 hrs. in dried air | 40 | 33 | 31 |

The activity figures in the above table represent the volume per cent of gasoline obtained on cracking a selected light gas oil fraction in accordance with the "Cat A" method described in "Laboratory Method for Determining the Activity of Cracking Catalysts" by J. Alexander and H. G. Shimp in National Petroleum News, Technical Section, August 2, 1944, pages R-537-538. In accordance with the test therein described a standard light gas oil is contacted with the catalyst at a temperature of 800° F. at atmospheric pressure and at a liquid space rate of 1.5 (volume of liquid charge/volume of catalyst/per hour) for a period of 10 minutes. The yield of motor gasoline of 410° F. cut point is measured and expressed as a per cent of the volume of oil charged. The quantity of gas and the amount of coke deposited in the catalyst are also measured and expressed in terms of weight per cent of charge.

To obtain the desired increase in steam stability of clay catalyst in accordance with the present invention, it is necessary that the special heat treatment be conducted in the substantial absence of water vapor. Conveniently, the treatment is effected in the presence of a gaseous atmosphere, inert with respect to the catalyst. Suitable inert gases are nitrogen, oxygen, or dried air. Atmospheric air cannot ordinarily be employed without being initially dried before contact with the clay being treated. Preferably the moisture in the treating medium is maintained as low as is practically possible, as below 0.1 pound per square inch partial pressure of water vapor. The treatment is effected conveniently at a temperature of about 1400° F.; although observable improvements in the steam stability of the catalyst may be obtained at somewhat lower temperatures as beginning at about 1200° F. Temperatures somewhat above 1400° F. may be employed without reduction in gasoline yield activity and up to the temperature at which the particular clay begins to shrink rapidly or shows incipient surface fusion, which for most clays of the sub-bentonite type generally occurs at about 1450° F. to 1500° F. At the higher temperatures within the stated range, it will be understood, that less time will be required for treatment, whereas at the lower temperatures within the designated range, as at about 1200° F., the permissible maximum water vapor in the vicinity of the catalyst during the heat treatment may be even somewhat higher than the heretofore indicated 0.1 pound per square inch partial vapor pressure without untoward effect, but in no event should the water vapor in the vicinity of the catalyst during treatment be as high as that giving a partial pressure of 0.2 pound per square inch. At the higher treating temperature in the indicated range, as at about 1400° F., the desired improved steam stability may be obtained in about 2 to 4 hours' treatment, whereas at the lower temperatures, as at about 1200° F., to produce the same effect will require 8 to 10 hours of treatment. A ready test of the sufficiency of the treatment is that effecting an improvement in steam stability such that the catalyst is reduced in activity by less than about 20% of its original activity when subjected to accelerated aging in steam at 950° F. for 100 hours.

Although it is conceivable that at times and in certain localities the atmospheric air may be quite low in humidity and even approach the required conditions as to limited moisture content above set forth, in practical operation of the process according to the described invention, such sporadically obtaining unique conditions cannot be relied upon. Wherefore, it is important that when air is employed as the heating medium, it should be previously dried under controlled conditions to an unexceedable maximum moisture content within the specified limits. The air may be dried in any known or desired manner such as by passing the same through a dehumidifier or drying tower containing calcium chloride or other desiccant or water binding agent. One form of apparatus that can be conveniently employed is designed to discharge dried air of a set maximum water vapor content regardless of the condition of the atmosphere. As to other proposed inert gases, the necessity for subjecting the same to a drying or dehumidifying step will depend upon the particular moisture content of the gas provided.

It should be noted that the catalyst being subjected to heat treatment with the dry gas may still contain a substantial quantity of releasable moisture of constitution and adsorption even though previously dried at lower temperatures (generally below 120° C.). At the high temperature treatment of the invention such moisture will be released to displace the original air or gas in the treater so that even if substantially dry gas is provided for treating the catalyst, there will soon be formed in the vicinity of the catalyst a progressively concentrating atmosphere of water vapor, which would defeat the purpose of the proposed treatment. This would be the case, for instance, if the catalyst were merely heated in the required temperature range in a container or bomb, whether the same is sealed, vented or open to the atmosphere, since incident convection, even in the latter case, would not remove the water laden gas at a sufficient rate or to a sufficient extent. Positive means should therefore be provided for the removal or dissipation of the water vapor freed from the catalytic mass being treated or for otherwise reducing the concentration thereof to remain within the stated permissible range. This is readily accomplished by the use of a continuous stream of flowing heated dried air or other inert gas to contact the catalyst mass and at a velocity sufficient to sweep out the water vapor as released from the catalyst mass. It is not entirely necessary that the velocity of the flow of air or inert gas be continued throughout the treatment, since the major portion of the releasable moisture will be passed off during the initial stages of the treatment as the temperature of the catalyst approaches substantially the temperature of the treating agent. When the rate of evolution of moisture from the catalyst has been sufficiently reduced, further heating may be accomplished, if desired, at reduced velocity or without continuous flowing of air or inert gas. Alternatively, the treatment may be carried out in an apparatus provided with positive exhaust or evacuating means to maintain the required dry atmosphere.

When an inert gaseous atmosphere is employed for the heat treatment and is maintained at atmospheric pressure, 0.1 pound per square inch of water vapor is equal to 0.67 mol per cent water vapor in the gas. Within the scope of this invention reduced total pressures may be employed. Thus, if the operation is conducted at one half atmosphere total pressure, a partial pressure of water vapor of 0.1 pound per square inch is equal to 1.33 mol per cent. As the total pressure continues to diminish, the allowable mol percentage of water vapor will continue to increase, the partial pressure remaining constant.

The value of a contact mass in catalytic cracking of hydrocarbon materials depends to a large extent upon its selectivity in producing from a charge stock high or acceptable yields of desired liquid products such as motor fuel with relatively low production of by-product gas and coke, particularly the latter. Although gaseous by-products can be usefully employed as charge to polymerization, alkylation or other processes, it is nevertheless generally preferable to employ catalysts having an inherent tendency to produce high ratios of normally liquid to gaseous products, since, even with such catalysts higher yields of gaseous products can be obtained, if desired, by the control of the severity of cracking conditions. The coky deposit formed in a cracking operation, however, represents loss of charge to products that are not essentially recoverable, and the reduction of the quantity of this product even as to small changes in ratio of coke produced to gasoline yield are highly significant in the consideration of the economics of commercial operation.

The effects of treating active clay catalysts at higher temperature in the substantial absence of water vapor are compared in the following table. The values given are based on results obtained in the cracking of the light gas oil under the conditions of the "Cat-A" method, hereinbefore described. Each of the samples treated consisted of a commercial acid activated sub-bentonite clay of the types known as "Filtrol" and "Super Filtrol."

Table 1

| Catalyst | Heat Treatment in dried air | App. Dens., Kg./Lit. | "Cat-A" Activity | | | | Gaso./coke ratio |
|---|---|---|---|---|---|---|---|
| | | | Gasoline | Coke | Gas | Gas Grav. | |
| Sample I | 1000° F.—2 hrs | 0.68 | 39.4 | 4.2 | 6.9 | 1.43 | 9.4 |
| | 1350° F.—2 hrs | 0.69 | 41.9 | 4.3 | 6.5 | 1.39 | 9.7 |
| Sample II | 1000° F.—2 hrs | 0.66 | 43.0 | 4.8 | 10.2 | 1.54 | 9.0 |
| | 1350° F.—2 hrs | 0.67 | 42.2 | 4.1 | 6.8 | 1.37 | 10.3 |
| | 1500° F.—2 hrs | 0.67 | 39.9 | 3.4 | 5.9 | 1.40 | 11.7 |
| | 1550° F.—2 hrs | 0.86 | 28.7 | 1.4 | 3.4 | 1.24 | 20.5 |
| | 1350° F.—20 hrs | 0.66 | 41.3 | 3.9 | 6.5 | 1.36 | 10.6 |
| Sample III | 1050° F.—2 hrs | 0.63 | 40.6 | 4.5 | 7.6 | 1.49 | 9.0 |
| | 1550° F.—2 hrs | 0.72 | 41.5 | 3.2 | 6.7 | 1.39 | 13.0 |

Each of the above heat treatments was carried out, at the temperature and for the time indicated, in flowing air dried by being passed through a dehydrator containing calcium chloride, so as to maintain the moisture content of the air below .005 mol per cent, at atmospheric pressure.

It will be seen from the above table that improved ratios of gasoline to coke and in most instances of gasoline to gas are already effected by a treatment in the dry atmosphere for two hours at 1350° F., becoming more pronounced at 1400° F., usually without significant reduction in the volume per cent of gasoline. Within the range of about 1500° to 1550° F., depending upon the particular sample of acid-activated clay, substantial shrinkage and increase in apparent density of the pellets is observed, accompanied by a lower gasoline yield, but giving exceptionally higher gasoline to coke ratios. These catalysts of high gasoline to coke ratio are particularly valuable in cracking of charge stocks normally tending to deposit comparatively large amounts of coke, such as the heavier stocks having constituents boiling above 900° F. or having a mid boiling point above about 650° F.

The several samples of commercial acid-activated clays treated in the above table, did not differ materially on analysis; that of sample III is given below, as typical (105° C. dry basis):

|  | Per cent |
|---|---|
| Ignition loss | 9.58 |
| Si as $SiO_2$ | 65.05 |
| Al as $Al_2O_3$ | 15.25 |
| Fe as $Fe_2O_3$ | 2.44 |
| Ca as CaO | 2.27 |
| Mg as MgO | 4.78 |
| Na as $Na_2O$ | 0.26 |

The selection of the particular temperature for the described heat treatment has a more decided influence on the degree of change effected in the properties of the catalyst, than does the length of time, but at any given temperature, it will be understood, that extending the duration of treatment will generally produce a somewhat increased effect. Accordingly, the length of time for treatment at any temperature within the required range may be chosen so as to be sufficient for the desired extent of change in properties of the particular catalyst. The effect of time will be seen from the following table based on heat treatments of the same clay as in sample III of Table 1 (extruded to a somewhat higher density).

Table 2

| Heat Treatment in dried air | "Cat-A" Activity | | | | Gaso./coke ratio |
|---|---|---|---|---|---|
| | Gasoline | Coke | Gas | Gas Grav. | |
| 1050° F.—2 hrs | 41.3 | 4.0 | 7.4 | 1.52 | 10.3 |
| 1000° F.—4 hrs | 39.8 | 3.9 | 6.6 | 1.56 | 10.2 |
| 1100° F.—4 hrs | 38.2 | 3.6 | 6.3 | 1.42 | 10.6 |
| 1200° F.—4 hrs | 38.0 | 3.5 | 7.3 | 1.41 | 10.9 |
| 1300° F.—4 hrs | 34.3 | 2.7 | 4.8 | 1.35 | 12.7 |
| 1400° F.—4 hrs | 42.2 | 3.3 | 6.3 | 1.49 | 12.8 |
| 1400° F.—10 hrs | 40.4 | 2.9 | 5.4 | 1.34 | 14.0 |
| 1050° F.—50 hrs | 39.2 | 3.5 | 5.9 | 1.41 | 11.2 |

It will also be seen from comparisons in the above Table 2, that the low coke obtained with high gasoline yield by treatment at about 1400° F. and above is wholly unexpected, since the same catalysts treated at intermediate temperatures within the range of about 1100° to about 1300° F., apparently show a tendency to lower gasoline yields without adequately compensating improvement in gasoline to coke ratios.

The clay catalyst may be subjected to the prescribed heat treatment of the present invention in any desired form and conveniently in the form in which it is to be employed as a catalyst in the hydrocarbon conversion operation. Thus, the mass may be treated in comminuted form as dried, finely divided powder or as larger particles or lumps or preferably as formed bodies which can be obtained by the extrusion of a wetted mass of the clay and cutting the extruded strands into desired lengths, which are then dried.

The catalyst treated in accordance with the present invention may be employed in the cracking of light gas oils and also in the cracking of heavy petroleum stocks such as those having a mid boiling point above 650° F., as well as in the treatment of gasoline, particularly catalytically or thermally cracked gasoline, to lower the acid heat and increase the octane value.

In the use of the catalysts treated in accordance with the present invention, the usual conditions of cracking can be availed of without modification, the catalyst being in the form of fine particles, granules, globules, pellets or the like. The described catalyst can be employed in fixed bed processes for cracking of petroleum fractions as well as in processes in which the catalyst moves or is moved through the reaction zone. As an example of a fixed bed operation, cracking may be carried out at a temperature of 800–900° F., employing a space rate (volume of charge liquid basis per volume of catalyst per hour) of about 1.5 and a pressure of about 15 pounds per square inch gauge. The temperature, of course, may be varied within the range of from about 700 up to about 1100° F., the space rate within the range of about 0.5 to 8 and pressures may be employed from about atmospheric or slightly lower up to about 100 pounds per square inch or higher. Under these conditions the operating period "on stream" may range from five to sixty minutes, for example 10 to 30 minutes alternating with regeneration periods. In commercial operation temperatures above 750° F. are preferred. Steam may be added to the charge stock and is particularly advantageous in assisting the vaporization of heavier stocks.

In processes other than the fixed bed, such as where the catalyst moves through the reaction zone, the conditions employed may be such as to subject the oil to substantially equivalent conditions including contact time and ratios of oil to catalyst as those set out above in connection with the fixed bed process.

Reforming may be carried out in accordance with the invention by charging a virgin or cracked gasoline or naphtha fraction under conditions similar to those employed in cracking.

Whereas in the fixed bed operation the catalyst is alternately subjected to regeneration, in the other processes the catalyst is passed during its cycle through a separate regeneration zone. In all of these processes regeneration is effected by contacting the catalyst after use, with air or other oxygen-containing gas to burn off carbonaceous deposit.

The treated catalysts of the present invention also find use in synthesis reactions, for example, polymerization of gaseous hydrocarbons to liquid products.

Obviously many modifications and variations of the invention as hereinbefore set forth may be made without departing from the spirit and scope thereof and therefore only such limitations should be imposed as are indicated in the appended claims.

I claim as my invention:

1. The process of effecting hydrocarbon conversion which comprises contacting a hydrocarbon charge stock with a catalyst comprising an acid activated clay which has been subjected, in unused state and prior to any contact with steam, to dry heat treatment equivalent to a temperature of about 1400° F. for ten hours, in an atmosphere of substantially dry gas chemically inert with respect to the catalyst.

2. Process of cracking petroleum hydrocarbons which comprises contacting said hydrocarbons with an active clay catalyst under catalytic cracking conditions, said clay catalyst without prior contact with steam having been previously subjected in unused state to heat treatment at a temperature above 1200° F. in the presence of a gas chemically inert with respect to the catalyst, in an atmosphere maintained free from water vapor in excess of about 0.1 pound per square inch.

3. Process of cracking heavy petroleum charge stocks having a mid-boiling point above about 650° F., which comprises contacting said charge stock under catalytic cracking conditions with an acid-activated clay catalyst, which catalyst without prior contact with steam has been previously subjected in unused state to heat treatment in the presence of a gas chemically inert with respect to the catalyst, in an atmosphere maintained free from water vapor in excess of about 0.1 pound per square inch and at a temperature in the range of 1400° to 1550° F.

HUBERT A. SHABAKER.

REFERENCES CITED

The following references are of record in the file of this patent:

UNITED STATES PATENTS

| Number | Name | Date |
|---|---|---|
| 2,215,305 | Voorhies, Jr. | Sept. 17, 1940 |
| 2,253,285 | Connolly | Aug. 19, 1941 |
| 2,307,795 | Kearby | Jan. 12, 1943 |
| 2,330,685 | Connolly | Sept. 28, 1943 |
| 2,388,735 | Gary et al. | Nov. 13, 1945 |
| 2,406,112 | Schulze | Aug. 20, 1946 |
| 2,432,822 | Secor | Dec. 16, 1947 |